US 6,874,489 B2

United States Patent
Yonekawa et al.

(10) Patent No.: US 6,874,489 B2
(45) Date of Patent: Apr. 5, 2005

(54) COMBUSTION CHAMBER STRUCTURE FOR INTERNAL COMBUSTION ENGINE

(75) Inventors: Akiyuki Yonekawa, Saitama (JP); Ayako Saito, Saitama (JP); Naohiro Ishikawa, Saitama (JP); Tohru Ohta, Saitama (JP); Seiji Mori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/650,126

(22) Filed: Aug. 28, 2003

(65) Prior Publication Data

US 2004/0123855 A1 Jul. 1, 2004

(30) Foreign Application Priority Data

Aug. 28, 2002 (JP) ...................................... P. 2002-248109

(51) Int. Cl.$^7$ ................................................. F02B 23/00
(52) U.S. Cl. ........................................ 123/661; 123/657
(58) Field of Search .................................. 123/658–666

(56) References Cited

U.S. PATENT DOCUMENTS 5,309,879 A * 5/1994 Regueiro ..................... 123/286

FOREIGN PATENT DOCUMENTS

JP         2002-89266         3/2002

* cited by examiner

Primary Examiner—Noah P. Kamen
(74) Attorney, Agent, or Firm—Armstrong, Kratz, Quintos, Hanson & Brooks, LLP

(57) ABSTRACT

There are provided on an upper surface of a piston 13 which confronts to a combustion chamber two first squish areas A1 each containing a flat surface 13a extending along an outer circumferential portion the piston 13 in an arc-like fashion and two second squish areas A2 formed between valve recesses 13d, 13e of respective pairs of inlet and exhaust valves 19, 21 and each containing a protruding portion which protrudes upwardly.

4 Claims, 7 Drawing Sheets

COMBUSTION CHAMBER STRUCTURE FOR INTERNAL COMBUSTION ENGINE

BACKGROUND OF THE INVENTION

The present invention relates to a combustion chamber structure for an internal combustion engine in which a combustion chamber is defined by a lower surface of an inner wall of a cylinder head which confronts a cylinder bore and an upper surface of a piston which slidably fits in the cylinder bore and in which a predetermined gap is formed between the lower surface of the inner wall of the cylinder head and the upper surface of the piston when the piston reaches the top dead center.

As approaches to prevention of the occurrence of knocks by sufficiently stirring air-fuel mixture within combustion chambers of an internal combustion engine, there are proposed an approach in which swirls are generated in the combustion chambers and an approach in which squishes are generated in the combustion chambers. The swirl is a spiraling flow of air-fuel mixture around the piston axis and is generated by the shape and position of the inlet port or by an inlet valve having a shroud. The squish is a radial flow of air-fuel mixture around the piston axis and is generated based on increased and decreased gaps formed between the piston and the cylinder head as the piston fluctuates.

The Unexamined Japanese Patent Application Publication No.2002-89266 describes a combustion chamber structure for an internal combustion engine for preventing the occurrence of knocks by generating a squish. In this combustion chamber structure, squishes directed towards a central portion of the combustion chamber are generated by flat slopes provided on the upper surface of the piston at diametrical ends thereof which intersect with an axis of a piston pin at right angles, and circumferential squishes are generated by conical slopes provided continuously on circumferential ends of the flat slopes. Then, the circumferential squishes are caused to collide with each other from opposite directions at the diametrical ends which follow the axis of the piston pin so as to deflect the circumferential squishes towards the central portion of the combustion chamber, whereby the squishes are spouted from the four circumferential portions of the combustion chamber towards the central portion thereof.

With the combustion chamber structure according to the related art, however, since the squishes are spouted from the four circumferential portions of the combustion chamber towards the central portion thereof, each squish becomes weak and hence it is difficult to sweep completely air-fuel mixture existing in an outer circumferential portion of the combustion chamber to the central portion thereof.

SUMMARY OF THE INVENTION

The invention is made in view of the situations, and an object thereof is to suppress the occurrence of knocks by effectively sweeping air-fuel mixture existing in the outer circumferential portion of the combustion chamber to the central portion thereof.

With a view to attaining the object, according to a first aspect of the invention, there is proposed a combustion chamber structure for an internal combustion engine in which a combustion chamber is defined by a lower surface of an inner wall of a cylinder head which confronts a cylinder bore and an upper surface of a piston which slidably fits in the cylinder bore and in which a predetermined gap is formed between the lower surface of the inner wall of the cylinder head and the upper surface of the piston, the combustion chamber structure for an internal combustion engine being characterized in that a squish area is provided between a pair of valve recesses formed adjacent to each other on the upper surface of the piston in a direction of an axis of a piston pin and in that the gap is formed such that the height thereof is higher at a circumferential center of the piston than on circumferential sides thereof in the squish area.

According to the construction of the first aspect of the invention, since the height of the gap between the piston and the cylinder head in the combustion chamber is set such that the height becomes higher at the circumferential center of the piston than on the circumferential sides thereof in the squish area provided between the pair of valve recesses formed adjacent to each other on the upper surface of the piston, air-fuel mixture can be collected from the circumferential sides of the squish area to the central portion thereof as the piston approaches the top dead center so that the air-fuel mixture so collected can be spouted therefrom towards the central portion of the combustion chamber further strongly, whereby the occurrence of knocks can be suppressed more effectively.

In addition, according to a second aspect of the invention, there is proposed a combustion chamber structure for an internal combustion engine as set forth in the first aspect of the invention, wherein the squish area is provided between the valve recesses for at least inlet valves.

According to the construction as set forth in the second aspect of the invention, since the squish area is provided between the valve recesses for the inlet valves, even in the event that a drop of liquid fuel falls into the combustion chamber from the inlet valve to thereby bring the air-fuel mixture in the combustion chamber to a rich state, the air-fuel mixture so made rich is strongly swept towards the central portion of the combustion chamber from the outer circumference of the piston by virtue of the squish area, whereby the occurrence of knocks can be suppressed more effectively.

According to a third aspect of the invention, there is proposed a combustion chamber structure for an internal combustion chamber in which a pair of inlet valves, a pair of exhaust valves and a sparking plug are caused to face a pentroof-type combustion chamber which is defined by a lower surface of an inner wall of a cylinder head which confronts a cylinder bore and an upper surface of a piston which slidably fits in the cylinder bore, the sparking plug being situated substantially at a central portion of the pentroof-type combustion chamber, the combustion chamber structure for an internal combustion engine comprising two first squish areas formed so as to connect valve recesses for the inlet valves and valve recesses for the exhaust valves, respectively, and each containing a flat surface extending along an outer circumferential portion on the upper surface of the piston in an arc-like fashion, and two second squish areas formed between the valve recesses for the pair of inlet valves and between the valve recesses for the pair of exhaust valves, respectively, and each containing a protruding portion which protrudes upwardly towards the lower surface of the inner wall of the cylinder head, wherein the protruding portion of each of the second squish areas has a first ridge line extending from an outer circumferential portion of the piston in such a manner as to be slanted up to an axis of the piston, a second ridge line connected to an end portion of the first ridge line which is closer to the axis of the piston and extending in a circumferential direction about the axis of the piston, a first slope extending from end portions of the two first squish areas in such a manner as to be slanted up to the first ridge line, and a second slope extending from the second ridge line in such a manner as to be slanted down to the axis of the piston.

According to the construction as set forth in the third aspect of the invention, when air-fuel mixture is supplied into the second squish area from the first squish areas disposed on the circumferential ends thereof, the air-fuel mixture so supplied ascends along the pair of slopes of the second squish area and thereafter is caused to collide against each other above the first ridge line so as to be deflected radially inwardly, whereby the air-fuel mixture continues to advance over the second ridge line and then descends along the second slope so as to be guided towards the sparking plug situated at the center of the combustion chamber. Thus, the air-fuel mixture existing in the outer circumferential portion of the combustion chamber can be swept towards the sparking plug situated at the center of the combustion chamber effectively, whereby the occurrence of knocks can be suppressed.

According to a fourth aspect of the invention, there is proposed a combustion chamber structure for an internal combustion engine as set forth in the third aspect of the invention, wherein a gap between the lower surface of the inner wall of the cylinder head and the upper surface of the piston is set such that the gap becomes, in the second squish area, larger at a portion thereof which faces the first ridge line and smaller on circumferential sides thereof which face the first squish areas.

According to the construction as set forth in the fourth aspect of the invention, since the gap between the cylinder head and the piston is set such that the gap becomes, in the second squish area, larger at the portion thereof which faces the first ridge line and smaller on the circumferential sides thereof which face the first squish areas, the air-fuel mixture supplied from the first squish areas to the second squish area can be collected to the central portion from the circumferential sides thereof so as to effectively be spouted towards the sparking plug situated at the center of the combustion chamber.

Note that the squish areas described in the first and second aspects of the invention correspond to second squish areas A2 in an embodiment of the invention.

BRIEF DESCRIPTION OF THE DRAWINGS

FIG. 2 is a sectional view of a cylinder head portion of the internal combustion engine taken along the line 2—2 in FIG. 1.

DETAILED DESCRIPTION OF THE PREFERRED EMBODIMENTS

An embodiment of the invention will be described below based on an embodiment illustrated in the accompanying drawings.

Figure 1:
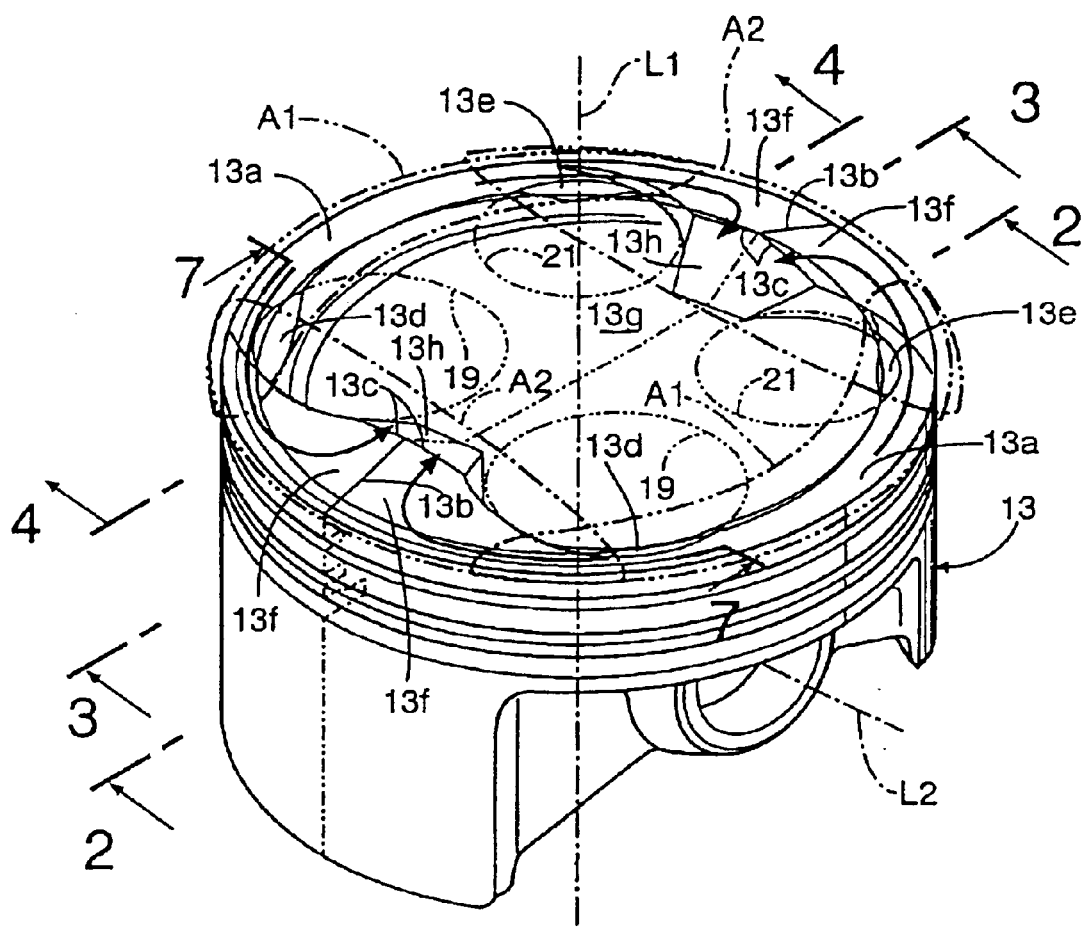
FIG. 1 is a perspective view of a piston of an internal combustion engine.
Figure 4:
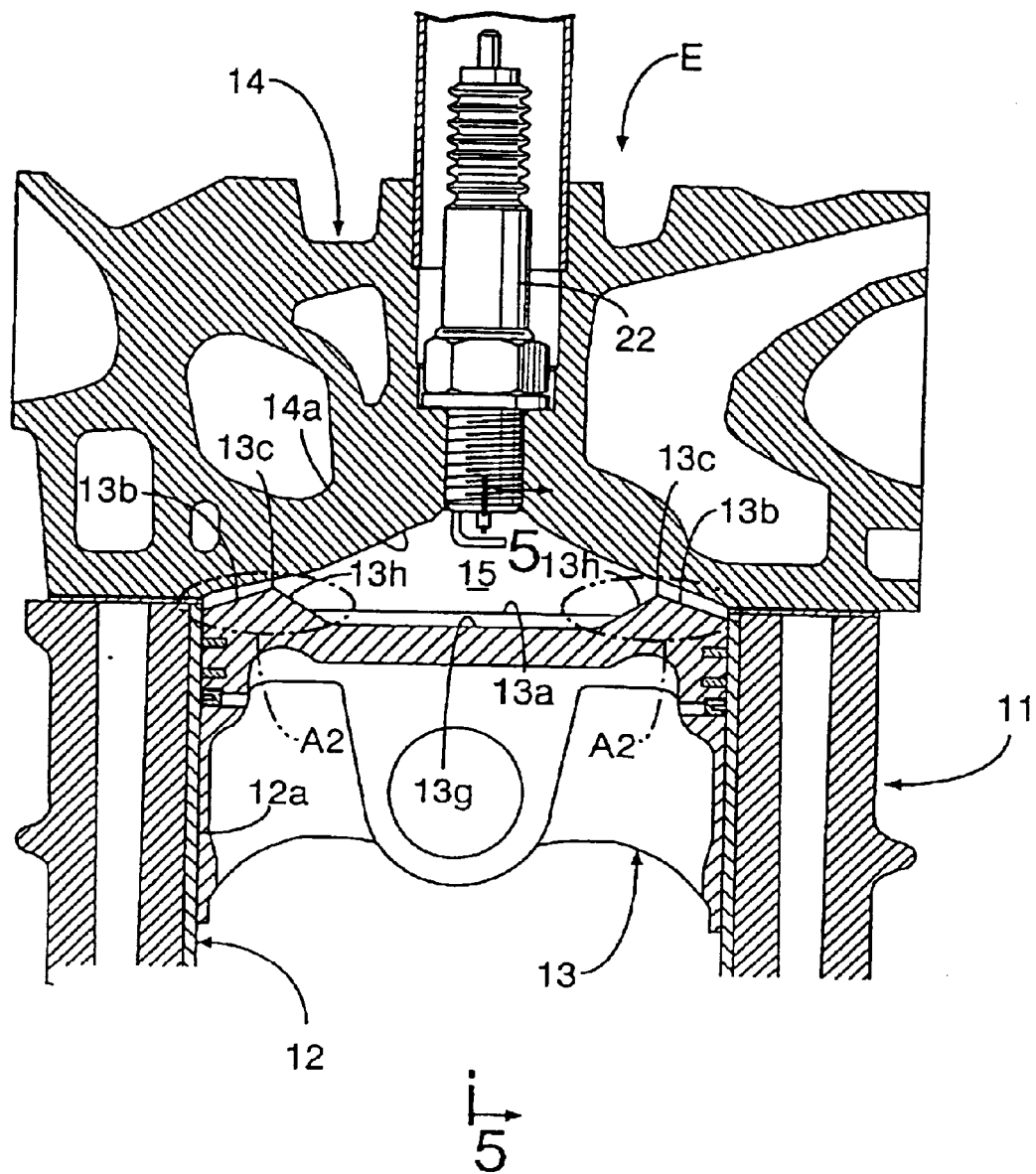
FIG. 4 is a sectional view of the cylinder head portion of the internal combustion engine taken along the line 4—4 in FIG. 1.
Figure 3:
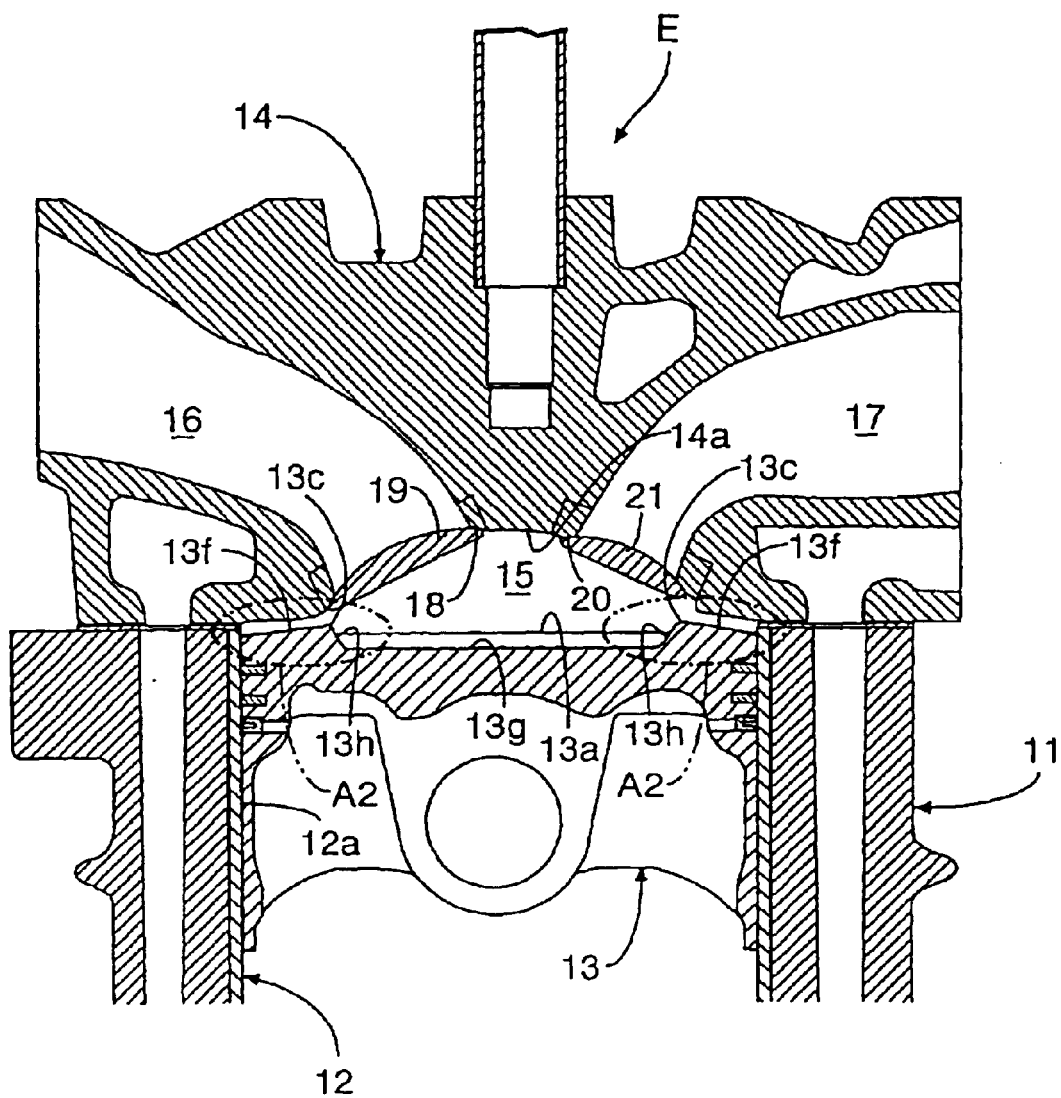
FIG. 3 is a sectional view of the cylinder head portion of the internal combustion engine taken along the line 3—3 in FIG. 1.
Figure 4:
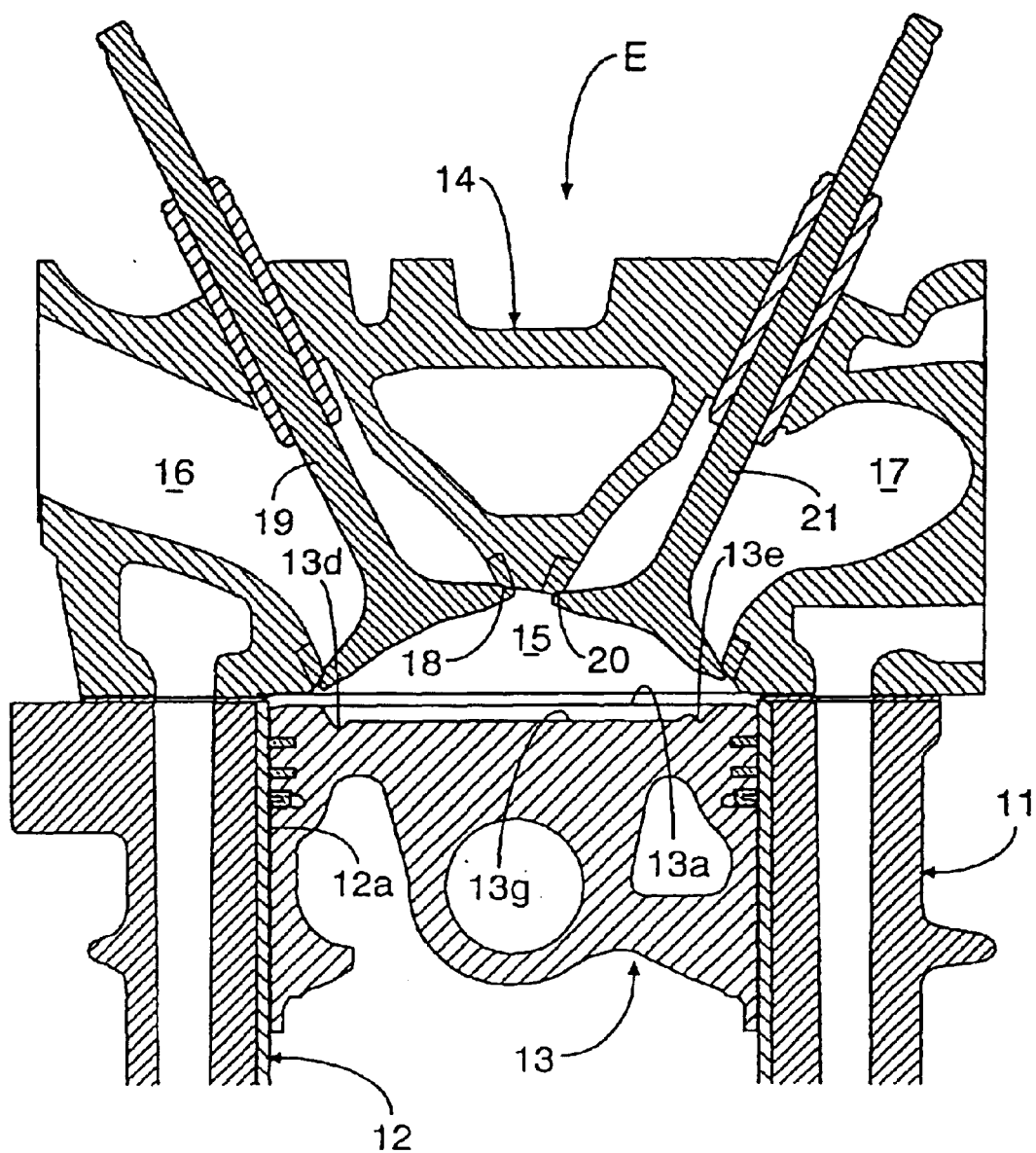
Figure 5:
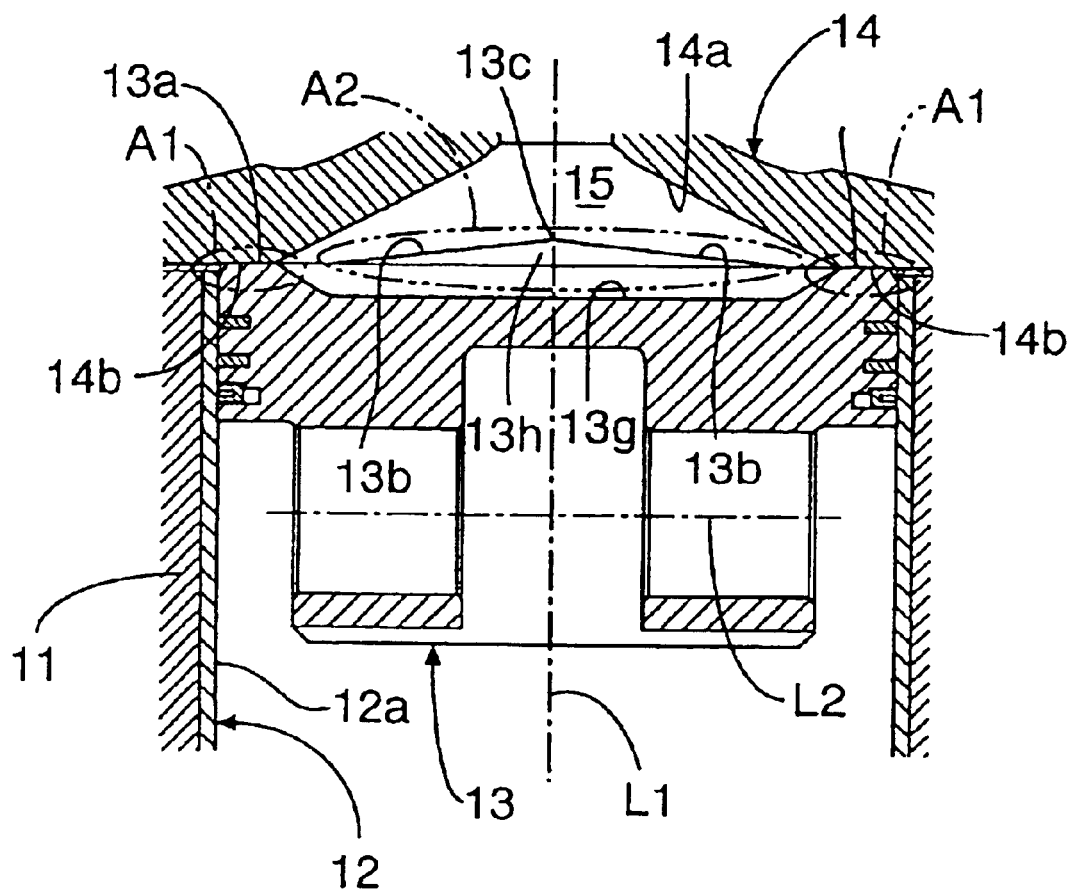
FIG. 5 is a sectional view taken along the line 5—5 in FIG. 2.
Figure 6:
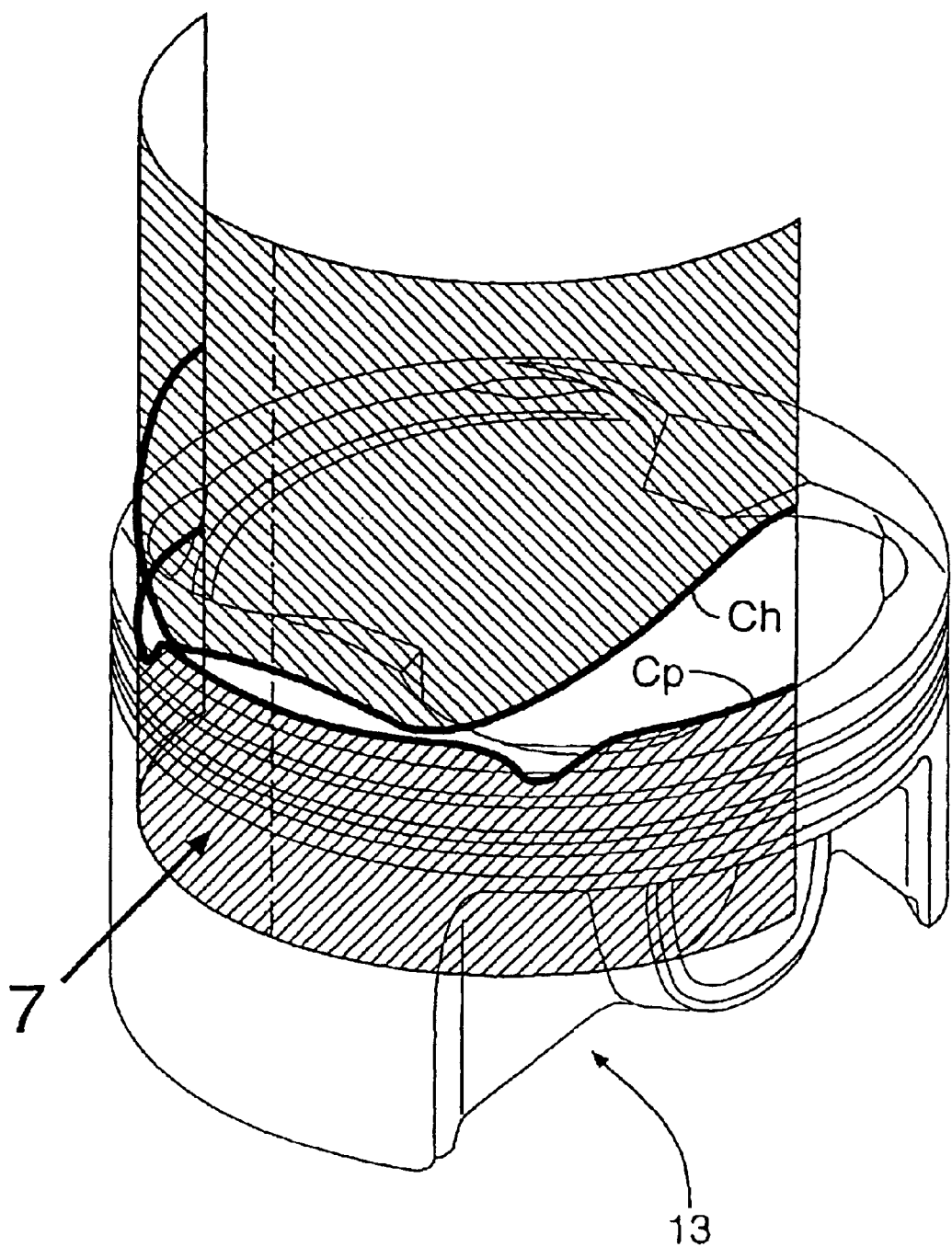
FIG. 6 is an explanatory view for illustrating the shapes of the piston and a combustion chamber.
Figure 7:
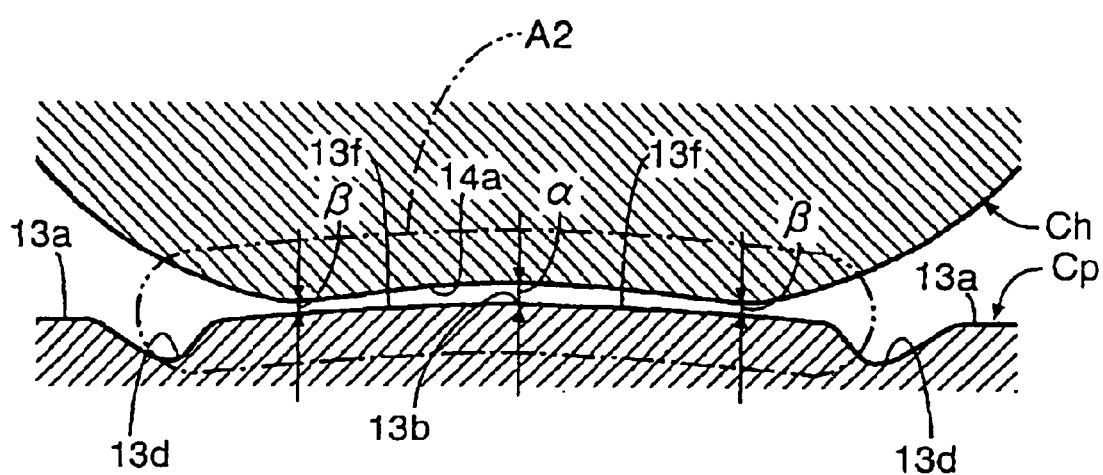
FIG. 7 is a view as viewed in a direction indicated by an arrow 7 in FIG. 6 (a view taken along the line 7—7 and as viewed in a direction indicated by an arrow 7 in FIG. 1).

FIGS. 1 to 7 illustrates an embodiment of the invention, in which FIG. 1 is a perspective view of a piston of an internal combustion engine, FIG. 2 is a sectional view of a cylinder head portion of the internal combustion engine taken along the line 2—2 in FIG. 1, FIG. 3 is a sectional view of the cylinder head portion of the internal combustion engine taken along the line 3—3 in FIG. 1, FIG. 4 is a sectional view of the cylinder head portion of the internal combustion engine taken along the line 4—4 in FIG. 1, FIG. 5 is a sectional view taken along the line 5—5 in FIG. 2, FIG. 6 is an explanatory view for illustrating the shapes of the piston and a combustion chamber, and FIG. 7 is a view as viewed in a direction indicated by an arrow 7 in FIG. 6 (a view taken along the line 7—7 and as viewed in a direction indicated by an arrow 7 in FIG. 1).

As shown in FIGS. 2 to 4, a cylinder sleeve 12 is accommodated in a cylinder block 11 of an internal combustion engine E, and a piston 13 slidably fits in a cylinder bore 12a of this cylinder sleeve 12. A cylinder head 14 connected to an upper surface of the cylinder block 11 has a recessed portion which faces the cylinder bore 12a, and a combustion chamber 15 is formed between a lower surface 14a of an inner wall of this recessed portion and an upper surface of the piston 13. Inlet ports 16 and exhaust ports 17 are formed in the cylinder head 14, and two inlet valve openings 18, 18 of the inlet ports 16 which communicate with the combustion chamber 15 are opened and closed by two inlet valves 19, 19, whereas two exhaust valve openings 20, 29 of the exhaust ports 17 which communicate with the combustion chamber 15 are opened and closed by two exhaust valves 21, 21. In addition, a sparking plug 22 is disposed at substantially at a central portion of the combustion chamber 15. The roof shape of the combustion chamber 15 (in other words, the shape of the lower face 14a of the inner wall of the cylinder head 14) is a so-called pentroof type, and as shown best in FIG. 2, the roof shape is slanted up to the central portion of the combustion chamber 15 where the sparking plug is disposed from an inlet side end portion and an exhaust side end portion of the combustion chamber 15 so as to form a triangle.

As is clear from FIG. 1, two first squish areas A1, A1 and two squish areas A2, A2 are formed on the upper surface of the piston 13. Each first squish area A1 is such as to be formed at an end portion in a direction of an axis L2 of a piston pin, and the squish area A1 extends along an outer circumferential portion of the upper surface of the piston 13 in an arc-like fashion while maintaining a constant width along its extension and contains a flat surface 13a which intersects with an axis L1 of a piston at right angles. As is clear when also referring to FIG. 5, in the first squish area A1, the inner wall lower surface 14a of the combustion chamber 15 which confronts the flat surface 13a of the piston 13 is made to constitute a flat surface 14b, and when the piston 13 is at the top dead center as shown in the figures, a gap between the flat surface 13a of the piston 13 and the flat surface 14b of the combustion chamber 15 almost disappears.

The second squish areas A2 are such as to be formed at both ends in a direction intersecting with the axis L2 of the piston pin at right angles and each contain a first ridge line 13b which extends from the outer circumferential portion of the piston 13 towards the axis L1 of the piston in such a manner as to ascend forwards and a second ridge line 13c which extends from an end portion of the first ridge line 13b which is closer to the axis L1 of the piston in circumferential directions about the axis L1 of the piston. Two valve recesses 13d, 13d are formed between the inlet side second squish area A2 and the two first squish areas A1, A1 in order to avoid an interference with the inlet valves 19, 19, and two valve recesses 13e, 13e are formed between the exhaust side second squish area A2 and the two first squish areas A1, A1 in order to avoid an interference with the exhaust valves 21, 21.

Two first slopes 13f, 13f are formed in such a manner as to ascend forwards from the inlet side valve recesses 13d, 13d (and the exhaust side valve recesses 13e, 13e) towards the first ridge line 13b, and a second slope 13h is formed in such a manner as to descend forwards from the second ridge line 13c towards a central bottom wall 13g of the piston 13. The first slopes 13f, 13f are made up of a three-dimensional curved surface, whereas the second slope 13h is made up of a flat surface. Consequently, the shape of the upper surface of the piston 13 is such that the central bottom wall 13g formed at the central portion of the upper face is lowest, the flat surfaces 13a, 13a of the first squish areas A1, A1 formed at the ends in the direction of the axis L2 of the piston pin are higher by one step than the central bottom wall 13g, the first slopes 13f, 13f of the second squish area A2 gradually ascend from the flat surfaces 13a, 13a, respectively, and the second slope 13h which is continuous with the first slopes 13f, 13f and is situated radially inwardly thereof descends down to the central bottom wall 13g. Then, the valve recesses 13d, 13d; 13e, 13e are positioned at boundary portions between the two first squish areas A1, A1 and the two second squish areas A2, A2.

In FIG. 6, when the piston 13 and the cylinder head 14 are cut along a cylindrical surface which passes slightly radially inwardly of an outer circumferential surface of the piston 13, cutting lines of the combustion chamber 15 are represented by Ch, Cp. The line Ch is a line of intersection between the cylinder head and the cylindrical surface, and the line Cp is a line of intersection between the piston 13 and the cylindrical surface.

As is clear from FIG. 7, the height of a gap in the second squish area A2 sandwiched by the upper surface of the piston 13 (line Cp) and the inner wall lower surface 14a of the cylinder head 14 (line Ch) becomes higher (a height $\alpha$) at a central portion thereof and lower (a height $\beta$) at circumferential end portions thereof.

Next, the function of the embodiment of the invention which is constructed as is described heretofore will be described.

When the piston 13 slidably fitting in the cylinder bore 12a approaches the top dead center in a compression stroke of the internal combustion engine E, the flat surfaces 14b, 14b of the inner wall lower surface 14a of the cylinder head 14 and the flat surfaces 13a, 13a of the upper surface of the piston 13 almost join together in the two squish areas A1, A1 which are provided at the ends in the direction of the axis L2 of the piston pin, and air-fuel mixture existing thereat is then pushed thereout as a squish. Part of the squish so pushed out flows in the circumferential direction of the combustion chamber 15, passes through the valve recesses 13d, 13d for the inlet valves 19, 19 and the valve recesses 13e, 13e for the exhaust valves 21, 21 and is then supplied to circumferential end portions of the two second squish areas A2, A2 which are provided at the ends in the direction which intersects with the axis L2 of the piston pin at right angles.

The air-fuel mixture so supplied to each of the two second squish areas A2, A2 flows along the pair of first slopes 13f, 13f which are formed on the sides of the first ridge line 13b in confronting directions and are then caused to collide against each other over the first ridge line 13b to thereby be deflected radially inwardly, whereupon the air-fuel mixture crosses over the second ridge line 13c and is then spouted along the second slope 13h towards the sparking plug 22 at the center of the combustion chamber 15 (refer to arrows in FIG. 1). As this occurs, as is clear from FIGS. 6 and 7, since the gap between the first slopes 13f, 13f of the piston and the inner wall lower surface 14a of the cylinder head 14 in the second squish area A2 is narrower at the circumferential ends and wider at the central portion (namely, at the portion where the first ridge line 13b exists), the air-fuel mixture on both the first slopes 13f, 13f is compressed towards the central first ridge line 13b, whereby the air-fuel mixture collide hard against each other over the first ridge line 13b and is eventually spouted along the second slope 13h strongly.

Thus, since the squishes are spouted from the diametrical ends which sandwich the axis L1 of the piston towards the center of the combustion chamber 15, when compared with the case where squishes are spouted toward the axis L1 of the piston from the four directions, each squish is made to be stronger so as to enhance the stirring effect of air-fuel mixture, whereby the occurrence of knocks can effectively be suppressed.

In particular, drops of liquid fuel tend to be collected at the inlet valve openings 18, 18 which communicate with the inlet ports 16 into which fuel is injected from an fuel injection valve, and when drops of liquid fuel so collected fall from the inlet valve openings 18, 18 into the combustion chamber 15, the air-fuel mixture existing in areas of the combustion chamber 15 to which the drops of liquid fuel fall becomes rich partially, which facilitates the occurrence of knocks. However, since the second squish area A2, which is one of the two second squish areas A2, A2, is provided between the valve recesses 13d, 13d for the pair of inlet valves 19, 19, the rich air-fuel mixture attributed to the drops of liquid fuel that have so fallen is effectively swept, whereby the prevention of occurrence of knocks can be ensured.

Thus, while the embodiment of the invention is described heretofore, the invention can be modified variously with respect to its design without departing from the sprit and scope thereof.

For example, while the second squish areas A2, A2 are provided on the inlet valves 19, 19 side and the exhaust valves 21, 21 side, respectively, in the embodiment, according to the first aspect of the invention, the second squish area A2 may be provided only on the inlet valves 19, 19 side or on the exhaust valves 21, 21 side. However, as is clear from the second aspect of the invention, the occurrence of knocks attributed to the fall of fuel drops can effectively be suppressed by providing the second squish area A2 on at least the inlet valves 19, 19 side.

Thus, as is described heretofore, according to the first aspect of the invention, since the height of the gap between the piston and the cylinder head in the combustion chamber is set such that the height becomes higher at the circumferential center of the piston than on the circumferential sides thereof in the squish area provided between the pair of valve recesses formed adjacent to each other on the upper surface of the piston, air-fuel mixture can be collected from the circumferential sides of the squish area to the central portion thereof as the piston approaches the top dead center so that the air-fuel mixture so collected can be spouted therefrom towards the central portion of the combustion chamber further strongly, whereby the occurrence of knocks can be suppressed more effectively.

In addition, according to the second aspect of the invention, since the squish area is provided between the valve recesses for the inlet valves, even in the event that a drop of liquid fuel falls into the combustion chamber from the inlet valve to thereby bring the air-fuel mixture in the combustion chamber to a rich state, the air-fuel mixture so made rich is strongly swept towards the central portion of the combustion chamber from the outer circumference of the piston by virtue of the squish area, whereby the occurrence of knocks can be suppressed more effectively.

Additionally, according to the third aspect of the invention, when air-fuel mixture is supplied into the second squish area from the first squish areas disposed on the circumferential ends thereof, the air-fuel mixture so supplied ascends along the pair of slopes of the second squish area and thereafter is caused to collide against each other above the first ridge line so as to be deflected radially inwardly, whereby the air-fuel mixture continues to advance over the second ridge line and then descends along the second slope so as to be guided towards the sparking plug situated at the center of the combustion chamber. Thus, the air-fuel mixture existing in the outer circumferential portion of the combustion chamber can be swept towards the sparking plug situated at the center of the combustion chamber effectively, whereby the occurrence of knocks can be suppressed.

In addition, according to the fourth aspect of the invention, since the gap between the cylinder head and the piston is set such that the gap becomes, in the second squish area, larger at the portion thereof which faces the first ridge line and smaller on the circumferential sides thereof which face the first squish areas, the air-fuel mixture supplied from the first squish areas to the second squish area can be collected to the central portion from the circumferential sides thereof so as to effectively be spouted towards the sparking plug situated at the center of the combustion chamber.

What is claimed is:

1. A combustion chamber structure for an internal combustion engine comprising:
    a piston (13), and
    a cylinder head (14),
    the combustion chamber being defined by a lower surface (14a) of an inner wall of the cylinder head (14) which confronts a cylinder bore (12a) and an upper surface of the piston (13) which slidably fits in the cylinder bore (12a), wherein
    a predetermined gap ($\alpha$, $\beta$) is formed between the lower surface (14) of the inner wall of the cylinder head (14) and the upper surface of the piston (13),
    a squish area (A2) is provided between a pair of valve recesses (13d, 13e) formed adjacent to each other on the upper surface of the piston (13) in a direction of an axis (L2) of a piston pin, and
    the gap ($\alpha$, $\beta$) is formed such that the height thereof is higher at a circumferential center of the piston (13) than on circumferential sides thereof in the squish area (A2).

2. The combustion chamber structure for an internal combustion engine as set forth in claim 1, wherein
    the squish area (A2) is provided between the valve recesses (13d) for at least inlet valves (19).

3. A combustion chamber structure for an internal combustion chamber comprising:
    a pair of inlet valves (19),
    a pair of exhaust valves (21), and
    a sparking plug (22) which are caused to face a pentroof-type combustion chamber (15) which is defined by a lower surface (14a) of an inner wall of a cylinder head (14) which confronts a cylinder bore (12a) and an upper surface of a piston (13) which slidably fits in the cylinder bore (12a), the sparking plug (22) being situated substantially at a central portion of the pentroof-type combustion chamber (15),
    two first squish areas (A1) formed so as to connect valve recesses (13d) for the inlet valves (19) and valve recesses (13e) for the exhaust valves (21), respectively, and each containing a flat surface (13a) extending along an outer circumferential portion on the upper surface of the piston (13) in an arc-like fashion, and
    two second squish areas (A2) formed between the valve recesses (13d) for the pair of inlet valves (19) and between the valve recesses (13e) for the pair of exhaust valves (21), respectively, and each containing a protruding portion which protrudes upwardly towards the lower surface (14a) of the inner wall of the cylinder head (14), wherein
    the protruding portion of each of the second squish areas (A2) has;
    a first ridge line (13b) extending from an outer circumferential portion of the piston (13) in such a manner as to be slanted up to an axis (L1) of the piston,
    a second ridge line (13c) connected to an end portion of the first ridge line (13b) which is closer to the axis (L1) of the piston and extending in a circumferential direction about the axis (L1) of the piston,
    a first slope (13f) extending from end portions of the two first squish areas (A1) in such a manner as to be slanted up to the first ridge line (13b), and
    a second slope (13h) extending from the second ridge line (13c) in such a manner as to be slanted down to the axis (L1) of the piston.

4. The combustion chamber structure for an internal combustion engine as set forth in claim 3, wherein
    a gap ($\alpha$, $\beta$) between the lower surface (14a) of the inner wall of the cylinder head (14) and the upper surface of the piston (13) is set such that the gap ($\alpha$, $\beta$) becomes, in the second squish area (A2), larger at a portion thereof which faces the first ridge line (13b) and smaller on circumferential sides thereof which face the first squish areas (A1).

* * * * *